(12) United States Patent
Krishnan

(10) Patent No.: US 12,515,711 B2
(45) Date of Patent: Jan. 6, 2026

(54) VEHICULAR AUTONOMOUS PARKING SYSTEM WITH ENHANCED PATH PLANNING

(71) Applicant: Magna Electronics Inc., Auburn Hills, MI (US)

(72) Inventor: Prashanth Krishnan, Natick, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 191 days.

(21) Appl. No.: 18/454,181

(22) Filed: Aug. 23, 2023

(65) Prior Publication Data

US 2024/0067223 A1    Feb. 29, 2024

Related U.S. Application Data

(60) Provisional application No. 63/373,350, filed on Aug. 24, 2022.

(51) Int. Cl.
  *B60W 60/00* (2020.01)
  *B60W 30/06* (2006.01)

(52) U.S. Cl.
  CPC ........ *B60W 60/0025* (2020.02); *B60W 30/06* (2013.01); *B60W 2420/403* (2013.01); *B60W 2420/408* (2024.01); *B60W 2556/50* (2020.02)

(58) Field of Classification Search
  CPC ............. B60W 60/0025; B60W 30/06; B60W 2420/403; B60W 2556/50; B62D 15/0285
  See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 8,874,317 B2 | 10/2014 | Marczok et al. |
| 10,078,789 B2 | 9/2018 | Gupta et al. |
| 10,214,206 B2 | 2/2019 | Latotzki |
| 10,222,224 B2 | 3/2019 | Johnson et al. |
| 10,328,932 B2 | 6/2019 | Gieseke et al. |
| 11,498,494 B2 | 11/2022 | Lynam et al. |
| 2017/0329346 A1 | 11/2017 | Latotzki |
| 2019/0041858 A1* | 2/2019 | Bortoff ................. B60W 10/20 |
| 2019/0176813 A1* | 6/2019 | Yamada ................ B60W 30/06 |
| 2020/0130676 A1 | 4/2020 | Smid |
| 2020/0284589 A1* | 9/2020 | Wartusch ........... G01C 21/3807 |
| 2023/0093053 A1 | 3/2023 | Joseph et al. |
| 2023/0294734 A1* | 9/2023 | Lee ................. B60W 30/18145 |
| 2024/0157965 A1* | 5/2024 | Douwa ............... B60W 60/001 |

* cited by examiner

*Primary Examiner* — Toya Pettiegrew
(74) *Attorney, Agent, or Firm* — HONIGMAN LLP

(57) ABSTRACT

A vehicular parking system includes a sensor disposed at a vehicle and capturing sensor data. The vehicular parking system, during a parking maneuver performed by a driver of the vehicle, records a trajectory traveled by the vehicle from an initial location to a parking location. Subsequent to recording the trajectory, and responsive to initiation of an autonomous parking maneuver, the system determines a target location on the recorded trajectory. The vehicular parking system determines a path from the current location of the vehicle to the determined target location on the recorded trajectory and controls the vehicle to travel to the determined target location on the recorded trajectory. The vehicular parking system controls the vehicle along the recorded trajectory to the parking location.

21 Claims, 3 Drawing Sheets

VEHICULAR AUTONOMOUS PARKING SYSTEM WITH ENHANCED PATH PLANNING

CROSS REFERENCE TO RELATED APPLICATION

The present application claims the filing benefits of U.S. provisional application Ser. No. 63/373,350, filed Aug. 24, 2022, which is hereby incorporated herein by reference in its entirety.

FIELD OF THE INVENTION

The present invention relates generally to a vehicle sensing system for a vehicle and, more particularly, to a vehicle sensing system that utilizes one or more sensors such as cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular parking system includes a sensor disposed at a vehicle equipped with the vehicular parking system. The sensor senses exterior of the vehicle and captures sensor data. The system includes an electronic control unit (ECU) with electronic circuitry and associated software. Sensor data captured by the sensor is transferred to and is processed at the ECU. The vehicular parking system, during a first parking maneuver performed by a driver of the vehicle to maneuver the vehicle toward a parking location, and responsive to processing at the ECU of sensor data captured by the sensor and transferred to the ECU, records a trajectory traveled by the vehicle from an initial location to the parking location. Subsequent to recording the trajectory traveled by the vehicle during the first parking maneuver, and when a current location of the vehicle is not along the recorded trajectory, and responsive to initiation of an autonomous parking maneuver toward the parking location for a subsequent parking maneuver that is subsequent to the first parking maneuver toward the parking location, the vehicular parking system determines a target location on the recorded trajectory. The vehicular parking system determines a path from the current location of the vehicle to the determined target location on the recorded trajectory. The vehicular parking system controls the vehicle, using the determined path, to travel from the current location of the vehicle to the determined target location on the recorded trajectory. The vehicular parking system controls the vehicle to travel along the recorded trajectory from the determined target location to the parking location.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or parking system and/or autonomous driving system operates to capture data representative of image data exterior of the vehicle and may process the captured sensor data to navigate the vehicle and to detect objects at or near the vehicle and in the predicted path of the vehicle, such as to assist in parking the vehicle. The sensing system includes a data processor or data processing system that is operable to receive and process sensor data from one or more sensors (e.g., cameras, radar sensors, etc.). The data processor may provide an output to a display device for displaying images representative of the captured sensor data. Optionally, the sensor system may provide a display, such as a rearview display or a top down or bird's eye or surround view display or the like.

Figure 1:
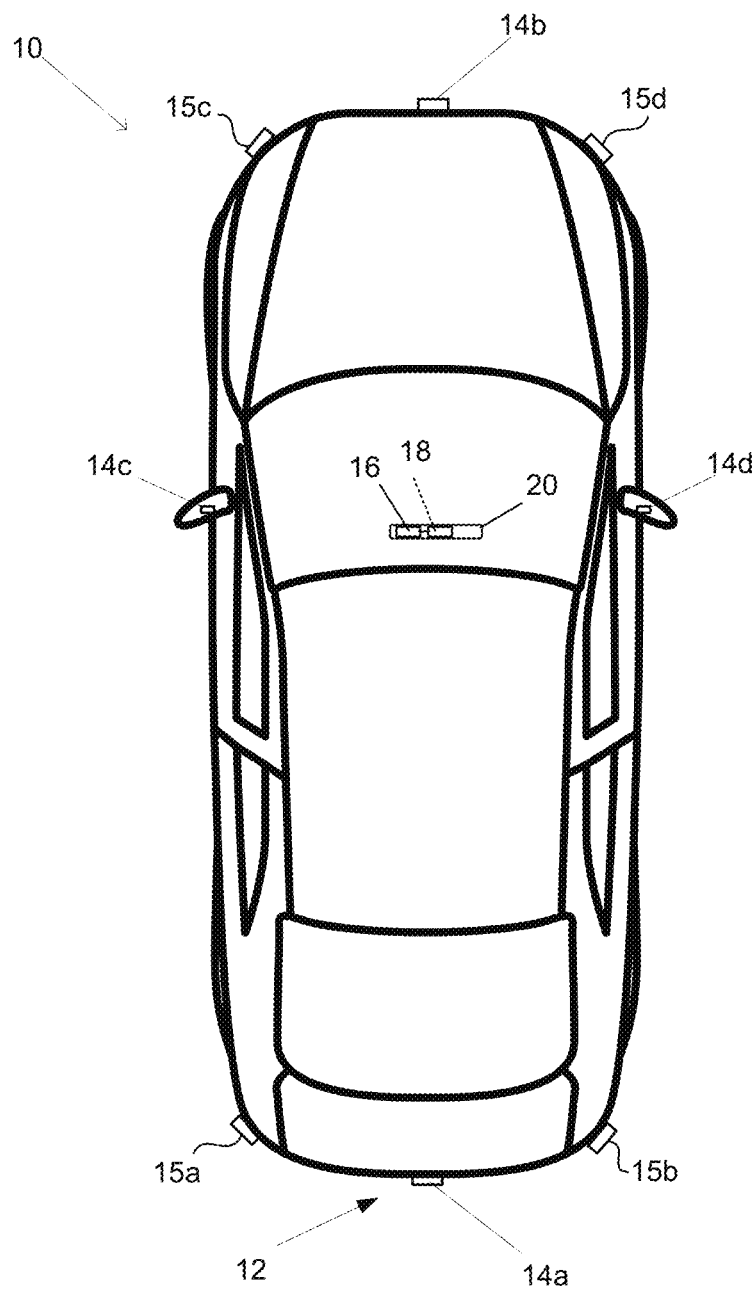
FIG. 1 is a plan view of a vehicle with a sensing system that incorporates sensors such as cameras and/or radar sensors.

Referring now to the drawings and the illustrative embodiments depicted therein, a vehicle 10 includes an sensing system or autonomous or semi-autonomous driving system 12 that includes at least one exterior viewing imaging sensor, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle) and/or rearward viewing corner radar sensor(s) 15a, 15b and/or forward viewing corner radar sensors 15c, 15d. The cameras, radar sensors, and/or other imaging sensors capture sensor data of the environment exterior of the vehicle. The camera(s) may have a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The sensing system 12 includes a control or electronic control unit (ECU) 18 having electronic circuitry and associated software, with the electronic circuitry including a data processor or data processor that is operable to process sensor data captured by the sensors, whereby the ECU may detect or determine presence of objects or the like and/or determine a location or position of the vehicle. The system may provide images to a display device of the vehicle (although shown in FIG. 1 as being part of or incorporated in or at an interior rearview mirror assembly 20 of the vehicle, the control and/or the display device may be disposed elsewhere at or in the vehicle). The system may include other sensors to assist in navigating the vehicle, such as a GPS sensor 16. The data transfer or signal communication from the sensors to the ECU may comprise any suitable data or communication link, such as a vehicle network bus or the like of the equipped vehicle.

Implementations herein include an automated parking system or sensing system that enables a vehicle to follow a parking maneuver that was previously demonstrated/performed/recorded by a driver of the vehicle. The system plans a path from the vehicle's initial or starting or current location to the closest point on the demonstrated trajectory (i.e., the closest point to the previously recorded trajectory). Then, the system navigates the path to the recorded trajectory and follows the recorded trajectory to arrive at a parking space or location.

Figure 2:
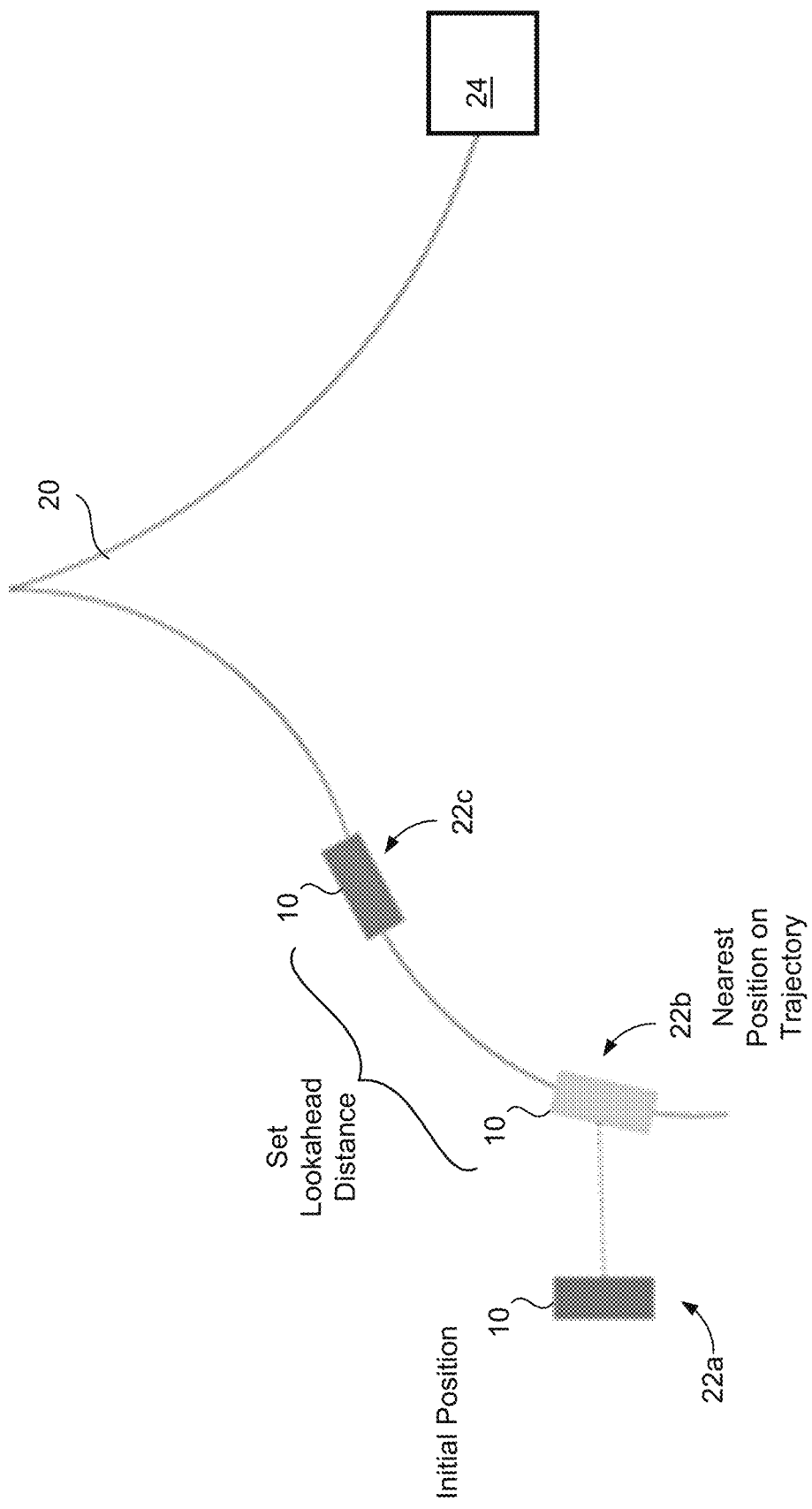
FIG. 2 is a schematic view of a vehicle navigating from an initial point to a recorded trajectory.

Initially, the system records or otherwise tracks a path the vehicle takes when a driver manually performs a parking maneuver. As shown in FIG. 2, a recorded trajectory 20 represents the trajectory the driver followed while performing the manual parking maneuver (e.g., navigating to a parking space, entering a parking space, etc.). For example, the trajectory 20 begins at the entrance of a parking facility (e.g., a parking lot, a parking garage, etc.) and ends at a dedicated parking space 24 for the vehicle. The vehicle may use any number of sensors to record the trajectory 20 as the driver manually drives the vehicle from the beginning or start of the trajectory 20 to the end of the trajectory 20. For example, the system uses sensor data from one or more cameras 14, one or more radar sensors 15, a GPS sensor, or any other sensor (e.g., ultrasonic sensors, lidar, etc.) to record the trajectory or path of the vehicle during the parking maneuver. For example, the system localizes the vehicle's location relative to the trajectory 20 by comparing the location and orientation of objects detected in the environment around the vehicle (e.g., using one or more cameras and/or radar sensors) to the location and orientation of the same objects during the recorded drive. Additionally or alternatively, the system tracks the vehicle's location using a GPS sensor or other navigation sensor. The driver may initiate the initial recording of the trajectory 20 via a user input (e.g., via actuating a button at a console or display of the vehicle, or via a smartphone of the user, or via a voice command, etc.) or the system may automatically record the maneuver based on determining that the maneuver is a parking maneuver (e.g., based on sensor data indicating the vehicle is in a parking location and/or based on the vehicle's speed, steering, etc.).

The system records the vehicle's steering, acceleration, and/or braking during the parking maneuver as the vehicle travels along the trajectory 20 such that the system can recreate the parking maneuver. The system may record the necessary data to maneuver the vehicle along the trajectory at memory disposed at the vehicle. After recording the trajectory 20, the driver and/or the vehicle may initiate an autonomous parking maneuver when the vehicle is within the vicinity of the parking space 24 or trajectory 20. For example, an occupant of the vehicle initiates the parking maneuver via a user input. The system may enable the feature when the system determines that the vehicle is within a threshold distance of the trajectory 20 or the parking space 24. The system may prompt the user (e.g., via a display disposed within the vehicle) whenever the system determines that the autonomous parking maneuver is available. The system may perform the autonomous parking maneuver at least in part by following the trajectory 20 to navigate to the parking space 24.

As shown in FIG. 2, when initiating the autonomous parking maneuver, the vehicle may not be located directly at or on the trajectory 20. That is, there is a possibility that the vehicle may not be located at the starting point of the trajectory 20 previously demonstrated by the driver (or at any point along the trajectory 20). In such situations, the system plans a path that guides the vehicle from its initial or current location (e.g., the location where the autonomous parking maneuver is initiated) to any location or point on or along the trajectory 20 (e.g., the nearest point of the trajectory 20). For example, the vehicle 10, at position 22a, initiates the autonomous parking maneuver. The system selects a target pose at a target location 22b on the trajectory 20 (i.e., an orientation of the vehicle at the trajectory 20) and the system plans a path to achieve the target pose at the target location 22b. Optionally, the system projects the vehicle's current pose (i.e., the orientation of the vehicle at the position 22a) onto a nearest point along the trajectory 20 (such as the position 22b) and then selects a point along the demonstrated trajectory 20 that is at a set lookahead distance (e.g., at least two meters, at least five meters, etc.) along the trajectory 20 in front of the projection (e.g., position 22c). That is, the system determines a second location further along the trajectory 20 a predetermined distance from the target location 22b. The system may plan a path from the initial position 22a to the target location 22b and then further along the trajectory 20 according to the lookahead distance to ensure the vehicle is able to achieve the pose necessary to follow the trajectory 20 (i.e., be oriented in a way to allow navigation of the trajectory 20).

Figure 3:
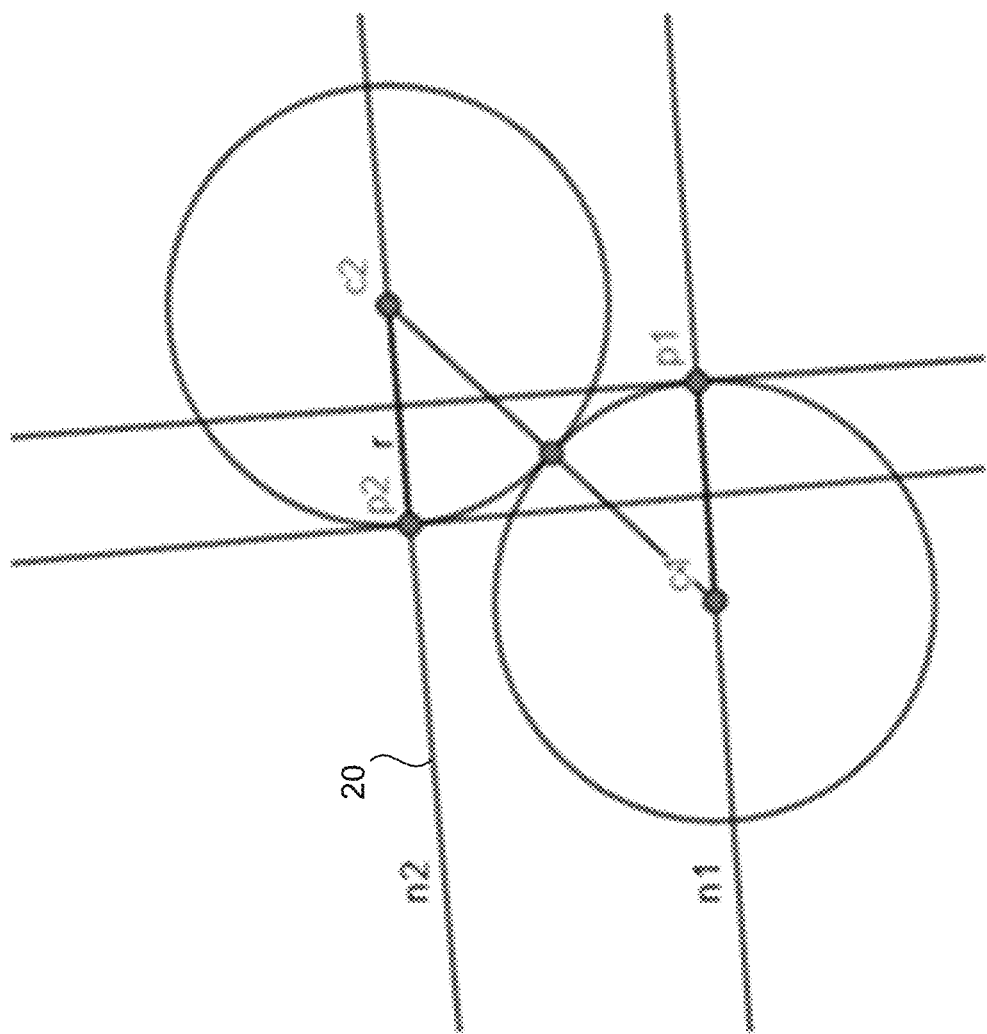
FIG. 3 is a schematic view of a dynamically feasible trajectory for a vehicle to traverse while parking.

Referring now to FIG. 3, a Dubins path refers to the shortest curve that connects two points in the two-dimensional Euclidean plane (i.e., the x-y plane). The system may determine the Dubins path from the initial location 22a of the vehicle (i.e., the position of the vehicle when the autonomous parking maneuver is initiated) to the projected pose at the target location 22b (e.g., the nearest point of the trajectory 20 to the initial location), thus ensuring a dynamically feasible trajectory for the vehicle to traverse.

Optionally, the system determines that the start pose of the vehicle (p1) lies on a circle of radius r (c1). The circle c1 is tangential to another circle (c2) of the same radius r that includes the projected pose (p2). In this scenario, there are exactly two such pairs of circles that connect the start pose p1 (i.e., the location where the autonomous parking maneuver is initiated) and the projected pose (i.e., a nearby location on the trajectory 20). The system determines both pairs of circles and selects the pair with the smaller radii. Generally, the circles with a larger radii result in a trajectory that is more circuitous and thus less ideal. As shown in FIG. 3, when p2 lies on the demonstrated trajectory 20, the rest of the trajectory may be safely traversed by the vehicle.

Thus, in some examples, the system records or otherwise determines a trajectory based on a parking maneuver performed by a driver of the vehicle. After recording the trajectory, and in response to initiation of an autonomous parking maneuver, the system determines a point or location on the recorded trajectory relative to the current location of the vehicle (e.g., the nearest point on the trajectory). The system plans a Dubins path from the current location of the vehicle to the determined point on the recorded trajectory and navigates to the determined point, using the Dubins path. Once at the determined point, the vehicle may traverse the recorded trajectory to the parking location.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking system, the vehicular parking system comprising:
   a sensor disposed at a vehicle equipped with the vehicular parking system, the sensor sensing exterior of the vehicle and capturing sensor data;
   an electronic control unit (ECU) comprising electronic circuitry and associated software;
   wherein sensor data captured by the sensor is transferred to and is processed at the ECU;
   wherein the vehicular parking system, during a first parking maneuver performed by a driver of the vehicle to maneuver the vehicle toward a parking location, and responsive to processing at the ECU of sensor data captured by the sensor and transferred to the ECU, records a trajectory traveled by the vehicle from an initial location to the parking location, and wherein the recorded trajectory comprises vehicle control data corresponding to the first parking maneuver performed by the driver, and wherein the vehicle control data comprises at least one selected from the group consisting of (i) steering data, (ii) acceleration data, and (iii) braking data;
   wherein, subsequent to recording the trajectory traveled by the vehicle during the first parking maneuver, and when a current location of the vehicle is not along the recorded trajectory, and responsive to initiation of an autonomous parking maneuver toward the parking location for a subsequent parking maneuver that is subsequent to the first parking maneuver toward the parking location, the vehicular parking system determines, as a target location on the recorded trajectory, a point on the recorded trajectory that is nearest to the current location of the vehicle;
   wherein the vehicular parking system determines a path from the current location of the vehicle to the determined target location on the recorded trajectory;
   wherein the vehicular parking system controls the vehicle, using the determined path, to travel from the current location of the vehicle to the determined target location on the recorded trajectory; and
   wherein the vehicular parking system controls the vehicle to travel along the recorded trajectory from the determined target location to the parking location by recreating at least a portion of the first parking maneuver using the vehicle control data.

2. The vehicular parking system of claim 1, wherein the sensor comprises at least one selected from the group consisting of (i) a camera and (ii) a radar sensor.

3. The vehicular parking system of claim 1, comprising a GPS sensor, wherein the vehicular parking system records the trajectory traveled by the vehicle responsive at least in part to GPS data captured by the GPS sensor.

4. The vehicular parking system of claim 1, wherein initiation of the autonomous parking maneuver is responsive to a user input by an occupant of the vehicle.

5. The vehicular parking system of claim 1, wherein the determined path comprises a Dubins path.

6. The vehicular parking system of claim 5, wherein the vehicular parking system, when determining the Dubins path, determines a plurality of pairs of circles, and wherein each pair of circles of the plurality of pairs of circles comprises (i) a first circle with a circumference that includes the current location of the vehicle and (ii) a second circle with a circumference that includes the determined target location on the recorded trajectory.

7. The vehicular parking system of claim 6, wherein the first circle and the second circle have the same radius.

8. The vehicular parking system of claim 7, wherein the vehicular parking system selects a pair of circles of the plurality of pairs of circles with the smallest radius.

9. The vehicular parking system of claim 6, wherein the vehicular parking system, when controlling the vehicle to travel from the current location of the vehicle to the determined target location on the recorded trajectory, follows a path comprising a portion of the circumference of the first circle and a portion of the circumference of the second circle.

10. The vehicular parking system of claim 1, wherein the vehicular parking system, responsive to controlling the vehicle to travel along the recorded trajectory to the parking location, autonomously parks the vehicle at the parking location.

11. The vehicular parking system of claim 1, wherein the vehicular parking system, responsive to determining that the current location of the vehicle is within a threshold distance of the recorded trajectory, alerts the driver of the vehicle that the autonomous parking maneuver is available.

12. The vehicular parking system of claim 1, wherein the vehicular parking system records the trajectory traveled by the vehicle during the first parking maneuver responsive to a user input from the driver of the vehicle.

13. A vehicular parking system, the vehicular parking system comprising:
   a sensor disposed at a vehicle equipped with the vehicular parking system, the sensor sensing exterior of the vehicle and capturing sensor data;
   an electronic control unit (ECU) comprising electronic circuitry and associated software;
   wherein sensor data captured by the sensor is transferred to and is processed at the ECU;
   wherein the vehicular parking system, during a first parking maneuver performed by a driver of the vehicle to maneuver the vehicle toward a parking location, and responsive to processing at the ECU of sensor data captured by the sensor and transferred to the ECU, records a trajectory traveled by the vehicle from an initial location to the parking location, and wherein the recorded trajectory comprises vehicle control data corresponding to the first parking maneuver performed by the driver, and wherein the vehicle control data comprises at least one selected from the group consisting of (i) steering data, (ii) acceleration data, and (iii) braking data;
   wherein, subsequent to recording the trajectory traveled by the vehicle during the first parking maneuver, and when a current location of the vehicle is not along the recorded trajectory, and responsive to initiation of an autonomous parking maneuver toward the parking location for a subsequent parking maneuver that is subsequent to the first parking maneuver toward the parking location, the vehicular parking system determines a target location on the recorded trajectory, and wherein the target location is a location on the recorded trajectory that is nearest to the current location of the vehicle;
   wherein the vehicular parking system determines a Dubins path from the current location of the vehicle to the determined target location on the recorded trajectory;
   wherein the vehicular parking system controls the vehicle, using the determined Dubins path, to travel from the current location of the vehicle to the determined target location on the recorded trajectory; and wherein the vehicular parking system controls the vehicle to travel along the recorded trajectory from the determined target location to the parking location by recreating at least a portion of the first parking maneuver using the vehicle control data.

14. The vehicular parking system of claim 13, wherein the sensor comprises at least one selected from the group consisting of (i) a camera and (ii) a radar sensor.

15. The vehicular parking system of claim 13, comprising a GPS sensor, wherein the vehicular parking system records the trajectory traveled by the vehicle responsive at least in part to GPS data captured by the GPS sensor.

16. The vehicular parking system of claim 13, wherein the vehicular parking system, when determining the Dubins path, determines a plurality of pairs of circles, and wherein each pair of circles of the plurality of pairs of circles comprises (i) a first circle with a circumference that includes the current location of the vehicle and (ii) a second circle with a circumference that includes the determined target location on the recorded trajectory.

17. The vehicular parking system of claim 16, wherein the first circle and the second circle have the same radius.

18. A vehicular parking system, the vehicular parking system comprising:

a sensor disposed at a vehicle equipped with the vehicular parking system, the sensor sensing exterior of the vehicle and capturing sensor data;

an electronic control unit (ECU) comprising electronic circuitry and associated software;

wherein sensor data captured by the sensor is transferred to and is processed at the ECU;

wherein the vehicular parking system, during a first parking maneuver performed by a driver of the vehicle to maneuver the vehicle toward a parking location, and responsive to processing at the ECU of sensor data captured by the sensor and transferred to the ECU, and responsive to a user input from the driver of the vehicle, records a trajectory traveled by the vehicle from an initial location to the parking location, and wherein the recorded trajectory comprises vehicle control data corresponding to the first parking maneuver performed by the driver, and wherein the vehicle control data comprises at least one selected from the group consisting of (i) steering data, (ii) acceleration data, and (iii) braking data;

wherein, subsequent to recording the trajectory traveled by the vehicle during the first parking maneuver, and when a current location of the vehicle is not along the recorded trajectory, the vehicular parking system, responsive to determining that the current location of the vehicle is within a threshold distance of the recorded trajectory, alerts the driver of the vehicle that an autonomous parking maneuver is available;

wherein, responsive to initiation of the autonomous parking maneuver toward the parking location for a subsequent parking maneuver that is subsequent to the first parking maneuver toward the parking location, the vehicular parking system determines, as a target location on the recorded trajectory, a point on the recorded trajectory that is nearest to the current location of the vehicle;

wherein the vehicular parking system determines a path from the current location of the vehicle to the determined target location on the recorded trajectory;

wherein the vehicular parking system controls the vehicle, using the determined path, to travel from the current location of the vehicle to the determined target location on the recorded trajectory; and wherein the vehicular parking system controls the vehicle to travel along the recorded trajectory from the determined target location to the parking location by recreating at least a portion of the first parking maneuver using the vehicle control data.

19. The vehicular parking system of claim 18, wherein the sensor comprises at least one selected from the group consisting of (i) a camera and (ii) a radar sensor.

20. The vehicular parking system of claim 18, comprising a GPS sensor, wherein the vehicular parking system records the trajectory traveled by the vehicle responsive at least in part to GPS data captured by the GPS sensor.

21. The vehicular parking system of claim 18, wherein the vehicular parking system, responsive to controlling the vehicle to travel along the recorded trajectory to the parking location, autonomously parks the vehicle at the parking location.

* * * * *